United States Patent Office

2,951,823
Patented Sept. 6, 1960

2,951,823

UNSATURATED POLYESTERS OF UNSATURATED α,β-DICARBOXYLIC ACIDS AND POLYVALENT ALCOHOLS

Hubert Sauer, Letmathe, Westphalia, Germany, assignor to Rutgerswerke-Aktiengesellschaft, Frankfurt, Germany No Drawing. Filed Feb. 4, 1957, Ser. No. 637,869

Claims priority, application Germany Feb. 11, 1956

9 Claims. (Cl. 260—45.4)

This invention relates to unsaturated polyesters and it has particular relation to unsaturated polyesters which are capable of mixed polymerization with suitable unsaturated compounds, e.g. vinyl compounds or allyl compounds.

It has been known to prepare such unsaturated polyesters from various unsaturated α,β-dicarboxylic acids and polyvalent alcohols. Usually, dicarboxylic acids, such as maleic acid, or maleic acid anhydride, or fumaric acid, are esterified with a polyalcohol, preferably a dialcohol, such as ethylene glycol, propylene glycol, or butylene glycol. Resins formed from these compounds are in cured or hardened condition too hard and brittle for most uses and, therefore, in the preparation of these resins one or more saturated dicarboxylic acids, e.g. phthalic acid anhydride or adipic acid, are used and co-esterified in order to form more elastic resinous esters which yield shaped bodies free from tension, upon curing. If curing is carried out in closed molds, the cured products are hard and free from tackiness. If, however, curing is carried out under free access of air, which is done particularly in the treatment of parts having large surface areas, sticky surfaces are obtained. This phenomenon is particularly troublesome in the use of polyesters as lacquer resins. The surfaces of coatings prepared with such resins are sticky and soft. Attempts to remove the sticky and soft surface layer by grinding, meet with considerable difficulties, because the grinding material soon becomes saturated with the soft resin and becomes inactive. Moreover, the necessity of an after-treatment by grinding and polishing means the loss of superiority of the polyester over other lacquers, because the polyester is supposed to yield ready films or coatings by one application, without any after-treatment.

It has been suggested previously (see, for example, British Patent No. 735,415 and German patent applications D14,167 and B16,300) to eliminate the above described surface tackiness by the incorporation of waxes or oils in the polyester resins. Such additions are supposed to be pressed to the surface during curing and to form a film there in order to eliminate the harmful influence of atmospheric oxygen. However, this suggestion is far from being satisfactory. Only a part of the oil or wax particles moves to the surface and the other particles which remain within the resin, cause the formation of soft spots in the film, or of a film which is too soft on the whole and is, therefore, useless as a lacquer coat. This fact has rather undesirable consequences particularly in the use of polyester resins in the form of lacquers, because hardening of the lacquer films is usually carried out at ordinary room temperature and thereby it can very easily happen that the added wax or oil remains in the interior of the film. In addition to the above mentioned undesired effect on the hardness of the film, it often happens that the lacquer becomes turbid and unattractive. If those parts of the oil or wax, which penetrated to the surface, are removed, the remaining surfaces become irregular and indicate a reduced quality of the lacquering.

If a polyester resin containing an addition of oils or waxes is used for the production of parts having large surface areas, in combination with glass fibers for reinforcement, the oil or wax particles remaining in the resin bring about a decrease in waterproofness and thus the possibility of a premature destruction of the polyester-glass fiber-bond.

It has now been found that these disadvantages of adding oils or waxes to polyester resins in order to avoid surface tackiness, can be eliminated by suitable selection according to the present invention of the ingredients, from which the polyester is formed.

It has been unexpectedly found that by using endomethylenetetrahydrophthalyl alcohol as the alcohol component in the preparation of unsaturated polyesters, a product results, which, upon mixed polymerization with monomeric, unsaturated compounds, yields completely hard and non-tacky surfaces, with free access of air during curing. Such resins are particularly suitable as lacquer resins for the production of parts having large surface areas, in combination with glass fibers.

In carrying out the present invention, for example the following unsaturated α,β-dicarboxylic acids can be used: maleic acid, fumaric acid, citraconic acid, itaconic acid, and others. As modifying agents the conventionally used saturated dicarboxylic acids, or monocarboxylic acids, e.g. phthalic acid anhydride or adipic acid are applicable. Furthermore, diene adducts from maleic acid anhydrides and suitable diene hydrocarbons, e.g. endomethylene-tetrahydro-phthalic acid anhydride and tetrahydrophthalic acid anhydride can also be used. In carrying out the invention, part of the endomethylene-tetrahydrophthalyl alcohol—up to ¾ of the stoichiometric amount of the dialcohol—can be substituted by other dialcohols or glycols, e.g. ethylene glycol, propylene glycol or butylene glycol.

Particularly favorable results have been obtained in the use of endomethylene-tetrahydrophthalic acid anhydride as a co-ingredient.

Esterification according to this invention is carried out in conventional manner by heating the reactants to temperatures up to 240° C. in an inert gas current with the addition of polymerization inhibitor. The resins embodying the invention have acid numbers in the range of 2 to 22 and can be mixed in any proportion with styrene.

As cross-linking agents vinyl compounds and allyl compounds can be used, e.g. styrene, styrenes substituted in the nucleus, diallyl phthalate, triallyl cyanurate and other allyl esters.

The resins can be pigmented or dyed.

Curing is carried out with conventional peroxide catalysts and accelerators either at ordinary room temperature, e.g. 15°–25° C., or at elevated temperature in the range of 70°–130° C.

Example 1

640 parts of maleic acid anhydride (6.5 mols)
960 parts of phthalic acid anhydride (6.5 mols)
1000 parts of 1,3-butylene glycol (11.2 mols)
490 parts of endomethylene-tetrahydrophthalyl-alcohol (3.2 mols)

are heated after the addition of 0.01% of hydroquinone in an atmosphere of $CO_2$. At 170° C. splitting off of water starts. The temperature is then slowly increased to 230° C. and this temperature is maintained until 230 parts of water are split off. The resin thus formed is then further heated at this temperature under a vacuum of about 10 mm. for about 15 minutes.

After cooling, the 2860 parts of polyester thus formed are mixed with 1140 parts of styrene. The resulting product has an acid number of 16, a viscosity of 650 cp. and an iodine color number of 1–2.

After the addition of 3% of cyclohexanone-peroxide (50% solution in cyclohexanone) and 1.5% of cobalt naphthenate (10% solution in styrene) the resin hardens under free access of air completely without tackiness at ordinary room temperature. A lacquer coating of the resin catalyzed in the above described manner yields a lacquer film which becomes completely dry after 75 minutes and is completely hard and free from tackiness after additional 2–3 hours.

A resin prepared from 6.5 mols of maleic acid anhydride, 6.5 mols of phthalic acid anhydride and 14.4 mols of 1,3-butylene glycol under otherwise equal conditions, yields upon hardening in the air shaped products or films which show considerable tackiness.

*Example 2*

755 parts (6.5 mols) of fumaric acid
960 parts (6.5 mols) of phthalic acid anhydride
1000 parts (11.2 mols) of 1,3-butylene glycol and
490 parts (3.2 mols) of endomethylenetetrahydrophthalyalcohol are reacted and further processed in substantially the same manner as described in the above Example 1.

*Example 3*

845 parts (6.5 mols) of citraconic acid
960 parts (6.5 mols) of phthalic acid anhydride
1000 parts (11.2 mols) of 1,3-butylene glycol and
490 parts (3.2 mols) of endomethylenetetrahydrophthalylalcohol are reacted and further processed in substantially the same manner as described in the above Example 1.

*Example 4*

845 parts (6.5 mols) of itaconic acid
960 parts (6.5 mols) of phthalic acid anhydride
1000 parts (11.2 mols) of 1,3-butylene glycol and
490 parts (3.2 mols) of endomethylenetetrahydrophthalylalcohol are reacted and further processed in substantially the same manner as described in the above Example 1.

*Example 5*

640 parts (6.5 mols) of maleic acid anhydride
740 parts (5 mols) of phthalic acid anhydride
220 parts (1.5 mols) of adipic acid
1000 parts (11.2 mols) of 1,3-butylene glycol
490 parts (3.2 mols) of endomethylenetetrahydrophthalylalcohol are reacted and further treated substantially in the same manner as described in the above Example 1.

*Example 6*

640 parts (6.5 mols) of maleic acid anhydride
1180 parts (6.5 mols) of endomethylenetetrahydrophthalic acid
1000 parts (11.2 mols) of 1,3-butylene glycol
490 parts (3.2 mols) of endomethylenetetrahydrophthalyl alcohol are esterified and then further processed substantially in the same manner as described in the above Example 1.

*Example 7*

885 parts (9.0 mols) of maleic acid anhydride
650 parts (7.2 mols) of 1,3-butylene glycol
1090 parts (7.2 mols) of endomethylenetetrahydrophthalylalcohol are reacted and treated in the manner described in the above Example 1.

The resin mixed with styrene to a mixture containing 28.5% of styrene, has an acid number of 22, a viscosity of 1130 cp. and an iodine color number of 1–2. The resin is somewhat more reactive than that obtained in Example 1. Films or coatings prepared therewith harden somewhat quicker and are then somewhat harder than films prepared with the product of Example 1.

*Example 8*

In the above Example 1, ⅓ to ½ of the molar amount of the 1,3-butylene glycol can be substituted by an equimolecular amount of ethylene glycol or propylene glycol, respectively. The procedure is substantially the same as in the above Example 1.

*Example 9*

450 parts (5 mols) of maleic acid anhydride
740 parts (5 mols) of phthalic acid anhydride
1670 parts (11 mols) of endomethylenetetrahydrophthalyl alcohol are reacted and treated in the following manner:

The mixture of the above ingredients is heated after the addition of 0.01% of hydroquinone in a $CO_2$-atmosphere. Splitting off of $H_2O$ starts at 165° C. The temperature is then slowly increased to 230° C. and this temperature is maintained until 100 parts of $H_2O$ are split off. The resinous reaction product is then subjected to a vacuum of about 10 mm. at 200°–220° C. for 15 additional minutes.

After cooling, 2760 parts of the polyester thus obtained are mixed with 1300 parts of styrene. The resulting product contains 33% of styrene, has an acid number of 20, a viscosity of 620 cp. and an iodine color number of 1–2.

After the addition of 8% of cumene hydroperoxide (70% solution in cumene) and 8% of cobalt naphthenate (10% solution in styrene), the resin cures or hardens under free access of air with a surface completely free from tackiness, at ordinary room temperature. When used as varnishing resin with the before-mentioned curing and accelerating means lacquer films or coatings are obtained, which become completely dry, very hard and entirely free from tackiness, in 3 hours.

*Example 10*

640 parts (6.5 mols) of maleic acid anhydride
960 parts (6.5 mols) of phthalic acid anhydride
620 parts (10.0 mols) of ethylene glycol
670 parts (4.4 mols) of endomethylenetetrahydrophthalyl alcohol are reacted and further treated in the manner described in the above Example 1.

*Example 11*

Any of the polyesters obtained in the above Examples 1–10 is copolymerized with styrene, whereby for example 30 to 70 parts by weight of styrene can be used for 100 parts by weight of the polyester.

The styrene can be substituted in copolymerization partly or entirely by equal amounts of polymerizable styrene derivatives, triallylcyanurate, diallyl phthalate, other allylesters and/or other copolymerizable compounds.

The fraction of the endomethylenetetrahydrophthalyl alcohol to be substituted by other dialcohols in the above described manner, depends on the number of the double bonds in the polyester molecule and can amount—in dependence on the quantity of unsaturated acid used—up to ¾. Resins thus prepared yield surfaces which are still sufficiently free from tackiness upon curing in the air.

The term "iodine color number" is used herein to define a color which is substantially the same as the color of an aqueous solution containing potassium iodide and the respective number of milligrams of iodine dissolved therein.

It will be understood from the above that the present invention is not limited to the compounds, steps, conditions and other details specifically described above and can be carried out with various modifications without departing from the scope of the invention, as defined in the appended claims.

The parts mentioned herein are by weight if not otherwise stated.

The viscosity values stated above refer to viscosities at about 25° C.

The above examples represent some completely specific embodiments of, and some best modes of carrying out the invention.

What is claimed is:

1. As a new resinous product, an unsaturated polyester having an acid number of 2–22 and comprising the reaction product of (a) a substance selected from the group consisting of α,β ethylenically unsaturated dicarboxylic acids and their anhydrides; (b) endomethylenetetrahydrophthalyl alcohol, and (c) at least one member of the group consisting of saturated dicarboxylic acids and their anhydrides, and unsubstituted aliphatic glycols; the molar proportion between said unsaturated dicarboxylic acids and their anhydrides and said saturated dicarboxylic acids and their anhydrides being in the range of 1:0 to 1:1 and the molar proportion between the endomethylenetetrahydrophthalyl-alcohol and said glycols being in the range of 1:0 to 1:3.5; the molar proportion of the total acids to the total alcohols being in the range of 1:1.1 to 1:1.6.

2. A hardenable resinous composition containing a resinous product as claimed in claim 1, in mixture with a substance copolymerizable with said resinous product and selected from the group consisting of styrene, styrenes substituted in the nucleus, diallyl phthalate and triallyl cyanurate.

3. A process for preparing a new resinous product having an acid number of 2–22 comprising heating a reaction mixture including (a) a substance selected from the group consisting of α,β ethylenically unsaturated dicarboxylic acids and their anhydrides; (b) endomethylenetetrahydrophthalyl alcohol, and (c) at least one member of the group consisting of saturated dicarboxylic acids and their anhydrides, and unsubstituted aliphatic glycols; the molar proportion between said unsaturated dicarboxylic acids and their anhydrides and said saturated dicarboxylic acids and their anhydrides being in the range of 1:0 to 1:1 and the molar proportion between the endomethylenetetrahydrophthalyl alcohol and said glycols being in the range of 1:0 to 1:3.5; and the molar proportion of acids to the alcohols being in the range of 1:1.1 to 1:1.6, to 230°–240° C.

4. A composition as claimed in claim 2, comprising 30–70 parts by weight of styrene for 100 parts by weight of the polyester.

5. As a new product, the resinous reaction product of 6.5 mols of maleic acid anhydride, 6.5 mols of phthalic acid anhydride, 11.2 mols of 1,3-butylene glycol and 3.2 mols of endomethylenetetrahydrophthalyl alcohol, said resinous reaction product having an acid number of about 16.

6. As a new product, the resinous reaction product of 5 mols of maleic acid anhydride, 5 mols of phthalic acid anhydride and 11 mols of endomethylenetetrahydrophthalyl alcohol, said resinous reaction product having an acid number of about 20.

7. As a new product, the resinous reaction product of 6.5 mols of maleic acid anhydride, 6.5 mols of phthalic acid anhydride, 10 mols of ethylene glycol and 4.4 mols of endomethylenetetrahydrophthalyl alcohol, said resinous product having an acid number in the range of 2–22.

8. As a new product, the resinous reaction product of 9.0 mols of maleic acid anhydride, 7.2 mols of 1,3-butylene glycol and 7.2 mols of endomethylenetetrahydrophthalyl alcohol, said resinous reaction product having an acid number of about 22.

9. As a new product, the resinous reaction product of 6.5 mols of maleic acid anhydride, 6.5 mols of endomethylenetetrahydrophthalic acid, 11.2 mols of 1,3-butylene glycol and 3.2 mols of endomethylenetetrahydrophthalyl alcohol, said resinous product having an acid number in the range of 2–22.

References Cited in the file of this patent
UNITED STATES PATENTS

| | | |
|---|---|---|
| 2,557,136 | Nichols | June 19, 1951 |
| 2,736,730 | Kleiman | Feb. 28, 1956 |